(12) United States Patent
Zhang et al.

(10) Patent No.: US 9,388,933 B2
(45) Date of Patent: Jul. 12, 2016

(54) SUPPORT FRAME AND ELECTRONIC DEVICE INCLUDING THE SAME

(71) Applicant: Wistron Corporation, New Taipei (TW)

(72) Inventors: Xiao-Yong Zhang, New Taipei (TW); Shawn Xiao, New Taipei (TW); Xu Zhang, New Taipei (TW)

(73) Assignee: Wistron Corporation (TW)

( * ) Notice: Subject to any disclaimer, the term of this patent is extended or adjusted under 35 U.S.C. 154(b) by 56 days.

(21) Appl. No.: 14/610,376

(22) Filed: Jan. 30, 2015

(65) Prior Publication Data

US 2016/0037665 A1    Feb. 4, 2016

(30) Foreign Application Priority Data

Jul. 29, 2014    (CN) .......................... 2014 1 0365642

(51) Int. Cl.
*H05K 5/02*    (2006.01)
*F16M 11/10*    (2006.01)

(52) U.S. Cl.
CPC ..................... *F16M 11/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,134,103 A * | 10/2000 | Ghanma | ................ | F16M 11/24 248/917 |
| 6,874,744 B2 * | 4/2005 | Rawlings | ............... | F16M 11/02 248/130 |
| 6,987,666 B2 * | 1/2006 | Medica | ................. | F16M 11/10 248/424 |
| 2005/0002156 A1 * | 1/2005 | Hsu | ........................ | F16M 11/00 361/679.07 |
| 2008/0029663 A1 * | 2/2008 | Derry | ................ | A47B 21/0314 248/178.1 |
| 2010/0171014 A1 * | 7/2010 | Stemple | ................ | F16M 11/04 248/201 |
| 2012/0153117 A1 * | 6/2012 | Bowman | ............... | F16M 11/04 248/599 |
| 2014/0043736 A1 * | 2/2014 | Onda | ................... | H05K 5/0217 361/679.01 |

FOREIGN PATENT DOCUMENTS

TW    201407324 A    2/2014
WO    WO 2012096471    7/2012

OTHER PUBLICATIONS

The Office Action issued to Taiwanese Counterpart Application No. 103127899 by the Taiwan Intellectual Property Office on Sep. 22, 2015 along with an English translation of sections boxed in red.

* cited by examiner

*Primary Examiner* — Lisa Lea Edmonds
(74) *Attorney, Agent, or Firm* — Brinks Gilson & Lione; John C. Bacoch (57) ABSTRACT

A support frame includes a base unit, a connecting unit and a supporting unit. The base unit includes two end portions and a receiving space. The connecting unit includes a connecting seat and a connecting arm connected to the connecting seat. The supporting unit includes supporting arms and a handlebar. Each of the supporting arms has a first end portion and a second end portion. The first end portions of the supporting arms are disposed between and connected to the end portions of the base. The connecting arm has an end arm portion that is connected to the second end portions of the supporting arms. The connecting unit and the supporting unit are stackable together and are receivable in the receiving space.

20 Claims, 11 Drawing Sheets

SUPPORT FRAME AND ELECTRONIC DEVICE INCLUDING THE SAME

CROSS-REFERENCE TO RELATED APPLICATION

This application claims priority of Chinese Application No. 201410365642.1, filed on Jul. 29, 2014.

FIELD OF THE DISCLOSURE

The disclosure relates to a multi-function support frame and an electronic device including the same.

BACKGROUND OF THE DISCLOSURE

A desktop electronic device with a display screen, such as a liquid crystal display device, or an all-in-one computer, generally includes a main body that has the display screen and a conventional support frame that supports the main body on a table.

However, the conventional support frame can only permit slight adjustment of an inclination angle of the main body in a front-rear direction thereof. By the conventional support frame, one is unable to flip the ma in body from forward facing to rearward facing to share the display screen to people sitting across therefrom. In addition, the main body is generally placed with its lengthwise direction parallel to the tabletop. With the conventional support frame unable to facilitate rotation of the main body from a landscape orientation to a portrait orientation, the user's versatile viewing needs cannot be satisfied.

Besides, most conventional support frames are unfoldable, thereby occupying a relatively large space and requiring more packaging materials for transportation. When unpackaged, carrying of the desktop electronic device often requires both hands of the user, which is relatively inconvenient.

Furthermore, with the current trend of reducing the thickness of desktop electronic devices, a built-in speaker thereof is made small as well, resulting in less satisfactory sound quality.

SUMMARY OF THE DISCLOSURE

Therefore, an object of the present disclosure is to provide a multi-function support frame.

Another object of the present disclosure is to provide an electronic device with a multi-function support frame.

According to one aspect of this disclosure, there is provided a support frame that includes a base unit, a connecting unit and a supporting unit. The base unit includes abase that has two end portions and that defines a receiving space. The connecting unit includes a connecting seat and a connecting arm connected to the connecting seat. The supporting unit includes a pair of supporting arms and a handlebar. Each of The supporting arms has a first end portion and a second end portion opposite to the first end portion. The handlebar is disposed between and connected to the first end portions of the supporting arms. The first end portions of the supporting arms are disposed between and connected respectively and pivotally to the end portions of the base such that the supporting unit is pivotable relative to the base. The connecting arm of the connecting unit has an end arm portion that is distal from the connecting seat and that is disposed between and connected pivotally to the second end portions of the supporting arms such that the connecting unit is pivotable relative to the supporting unit. The connecting unit and the supporting unit are stackable together and are receivable in the receiving space.

According to another aspect of the present disclosure, there is provided an electronic device that includes a main body and a support frame. The main body includes a housing and a display screen mounted to the housing. The support frame includes a base unit, a connecting unit and a supporting unit. The base unit includes a base that has two end portions and that defines a receiving space. The connecting unit includes a connecting seat connected to the housing and a connecting arm connected to the connecting seat. The supporting unit includes a pair of supporting arms and a handlebar. Each of the supporting arms has a first end portion and a second end portion opposite to the first end portion. The handlebar is disposed between and connected to the first end portions of the supporting arms. The first end portions of the supporting arms are disposed between and connected respectively and pivotally to the end portions of the base such that the supporting unit is pivotable relative to the base. The connecting arm of the connecting unit has an end arm portion that is distal from the connecting seat and that is disposed between and connected pivotally to the second end portions of the supporting arms such that the connecting unit is pivotable relative to the supporting unit. The connecting unit and the supporting unit are stackable together and are receivable in the receiving space.

BRIEF DESCRIPTION OF THE DRAWINGS

Other features and advantages of the present disclosure will become apparent in the following detailed description of the embodiment with reference to the accompanying drawings, of which.

DETAILED DESCRIPTION OF THE EMBODIMENT

Referring to FIGS. 1 to 6, an embodiment of an electronic device 100 according to the present disclosure is illustrated. The electronic device 100 includes a main body 1 and a support frame 2. The main body 1 includes a housing 11 and a display screen 12 mounted to the housing 11. The support frame 2 includes a base unit 3, a connecting unit 4 and a supporting unit 5.

Figure 1:
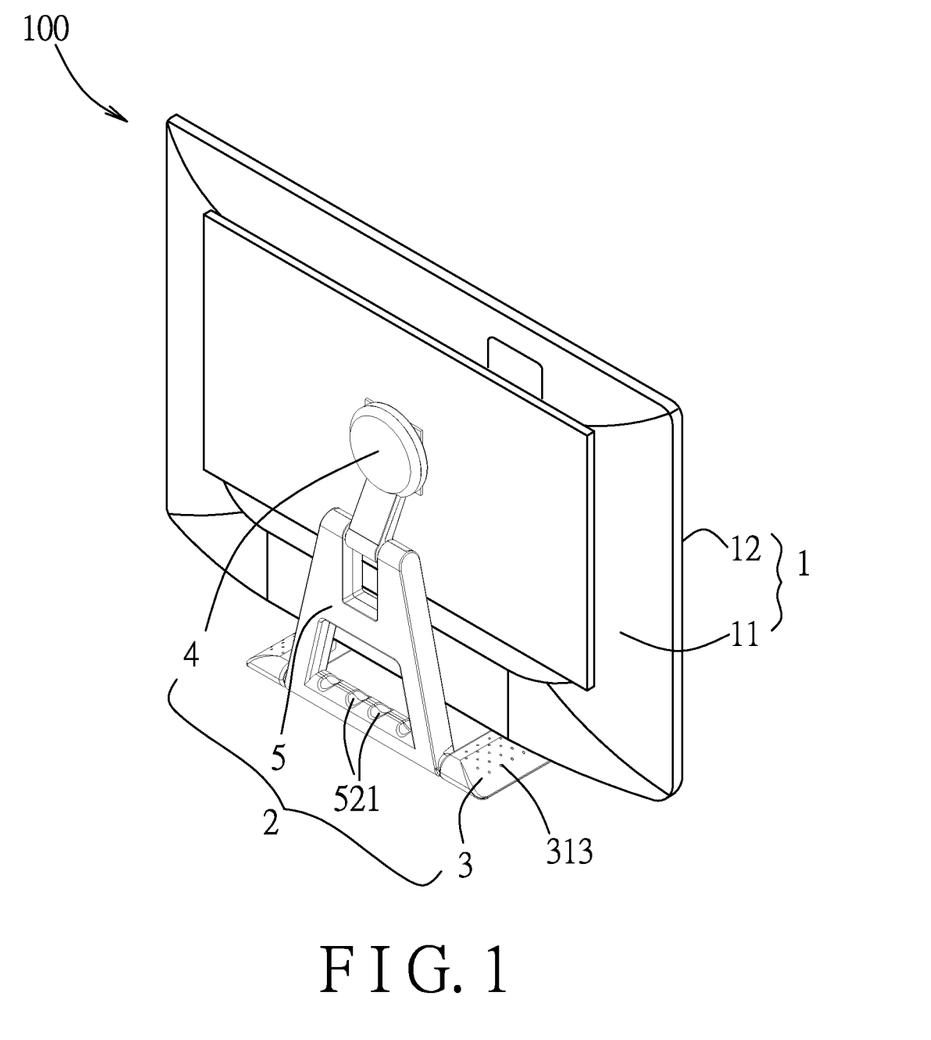
FIG. 1 is a perspective view illustrating an embodiment of an electronic device according to the present disclosure.
Figure 2:
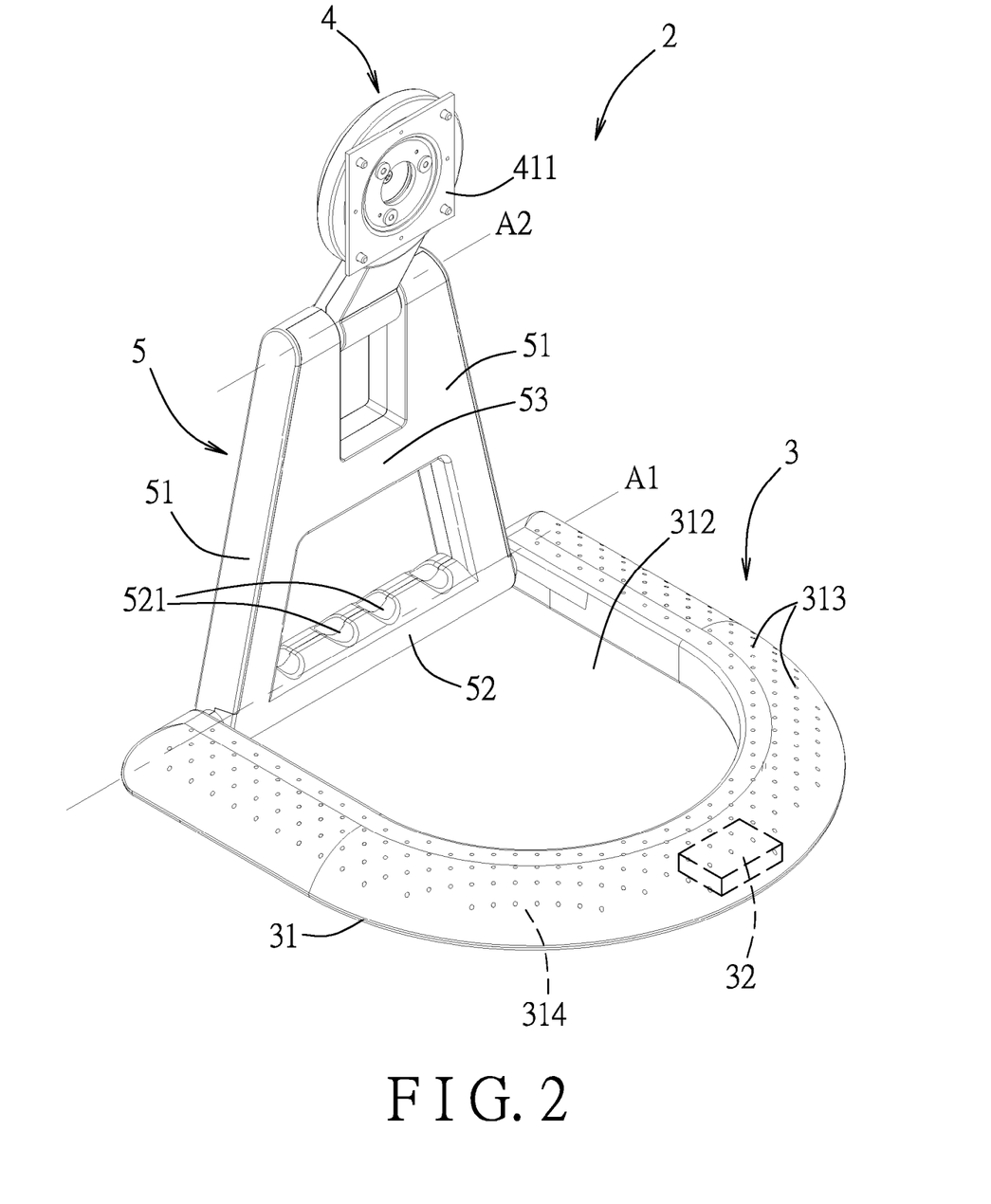
FIG. 2 is a perspective view illustrating a support frame of the embodiment.
Figure 3:
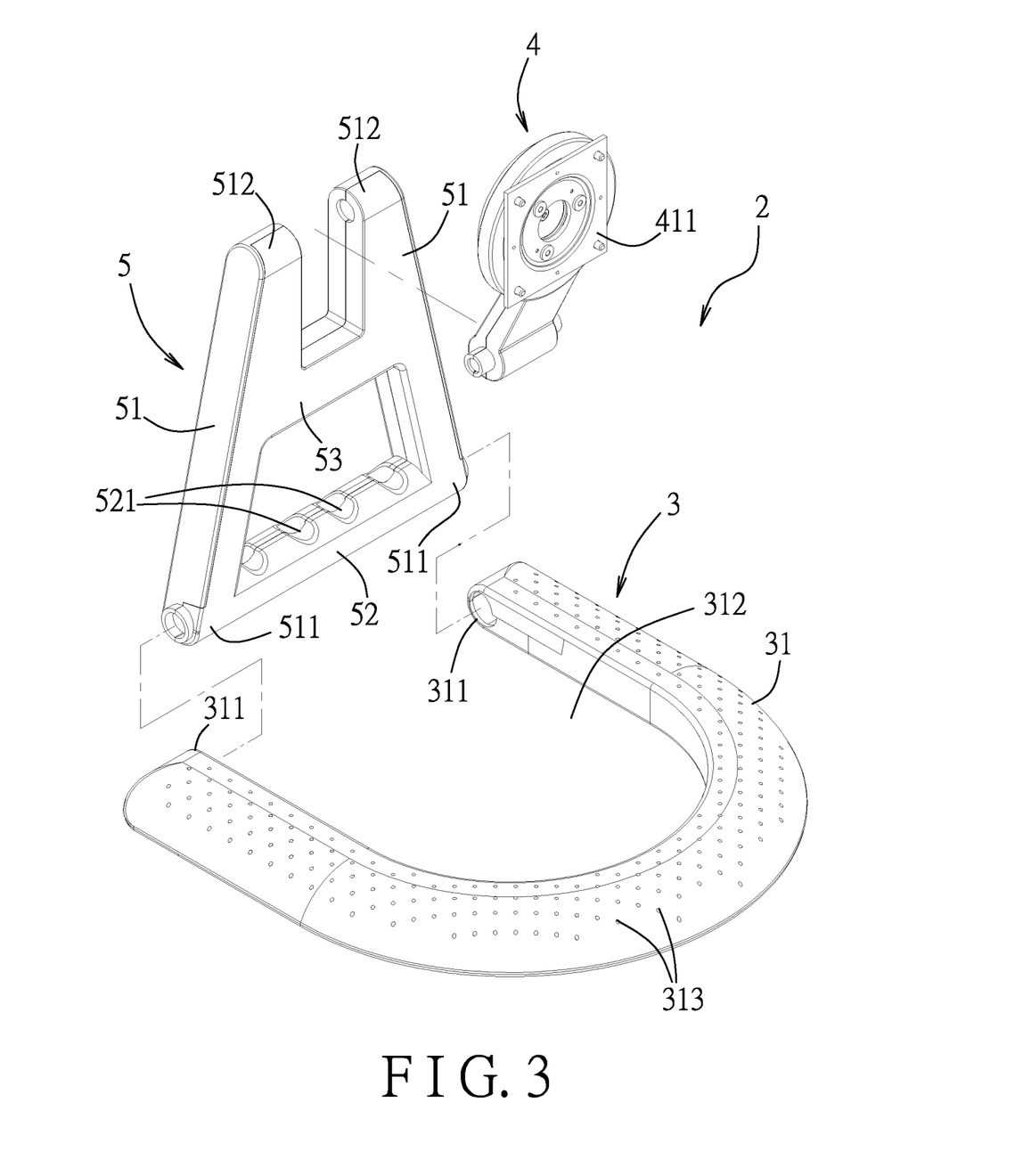
FIG. 3 is a partly-exploded perspective view illustrating the support frame of the embodiment.
Figure 4:
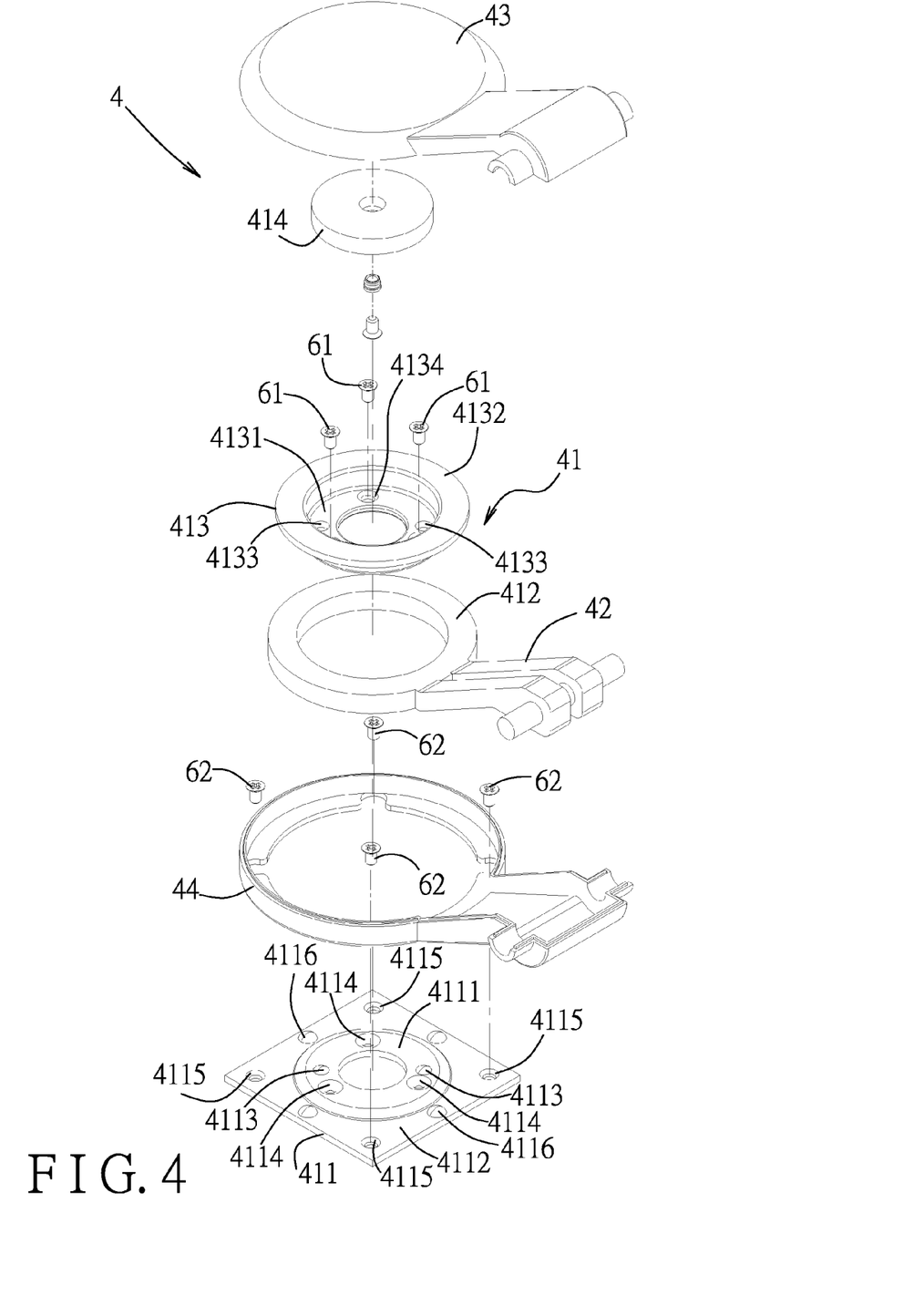
FIG. 4 is an exploded perspective view illustrating a connecting unit of the support frame.

The base unit 3 includes a base 31 that has a substantially U-shaped configuration, and a speaker 32 that is disposed inside the base 31. In this disclosure, the base 31 has two end portions 311 and defines a receiving space 312. In addition, the base 31 further has a hollow main portion 314 that is connected to the end portions 311 and that is formed with a plurality of through holes 313. The speaker 32 is disposed inside the hollow main portion 314 and produces sound that exit the hollow main portion 314 via the through holes 313. Preferably, the entire base 31 is hollow. The hollow main portion 314 attributes to resonating and amplifying the sound produced by the speaker 32 to achieve relatively high-quality sound quality.

Figure 5:
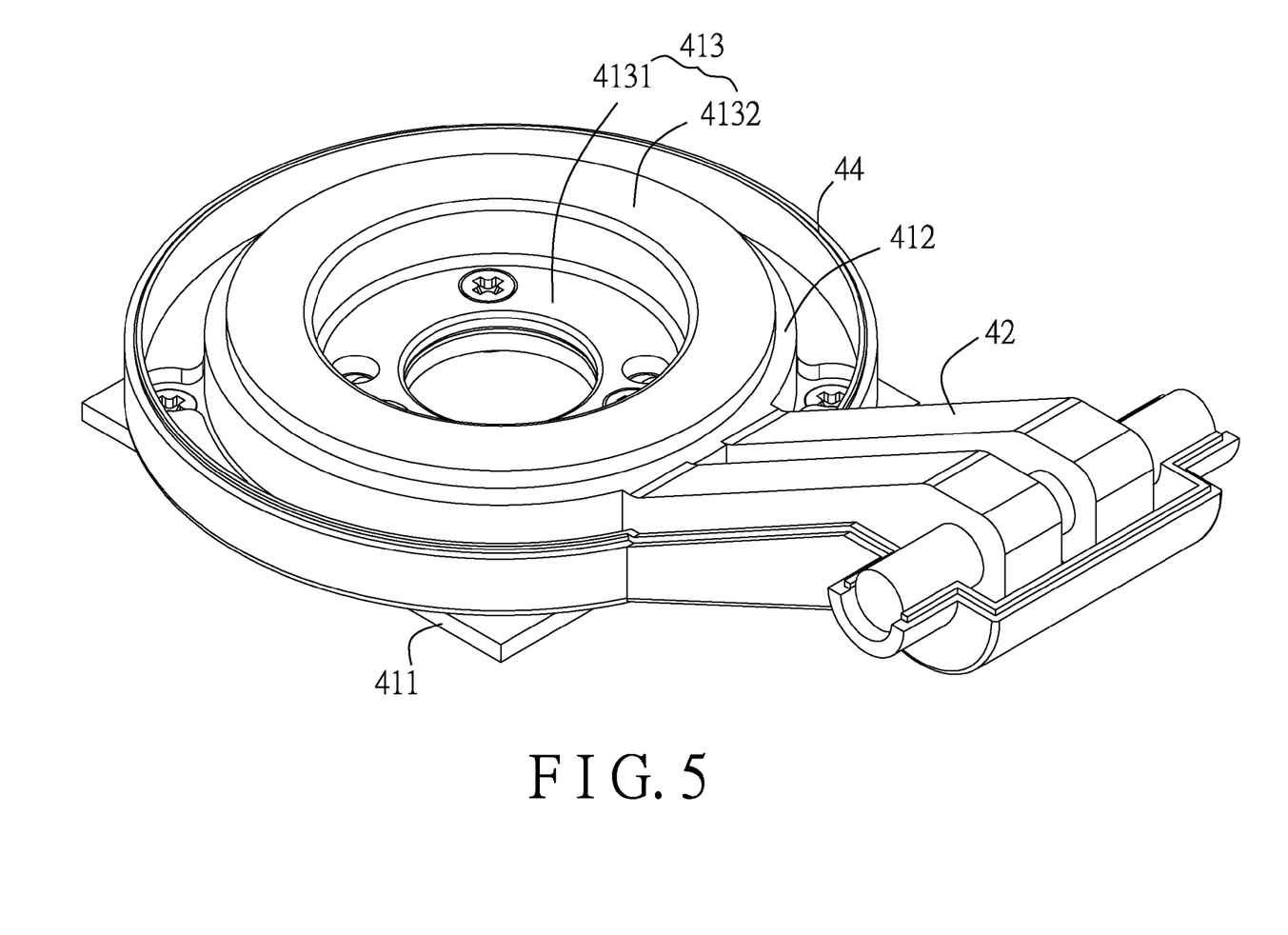
FIG. 5 is a perspective view illustrating the connecting unit.
Figure 6:
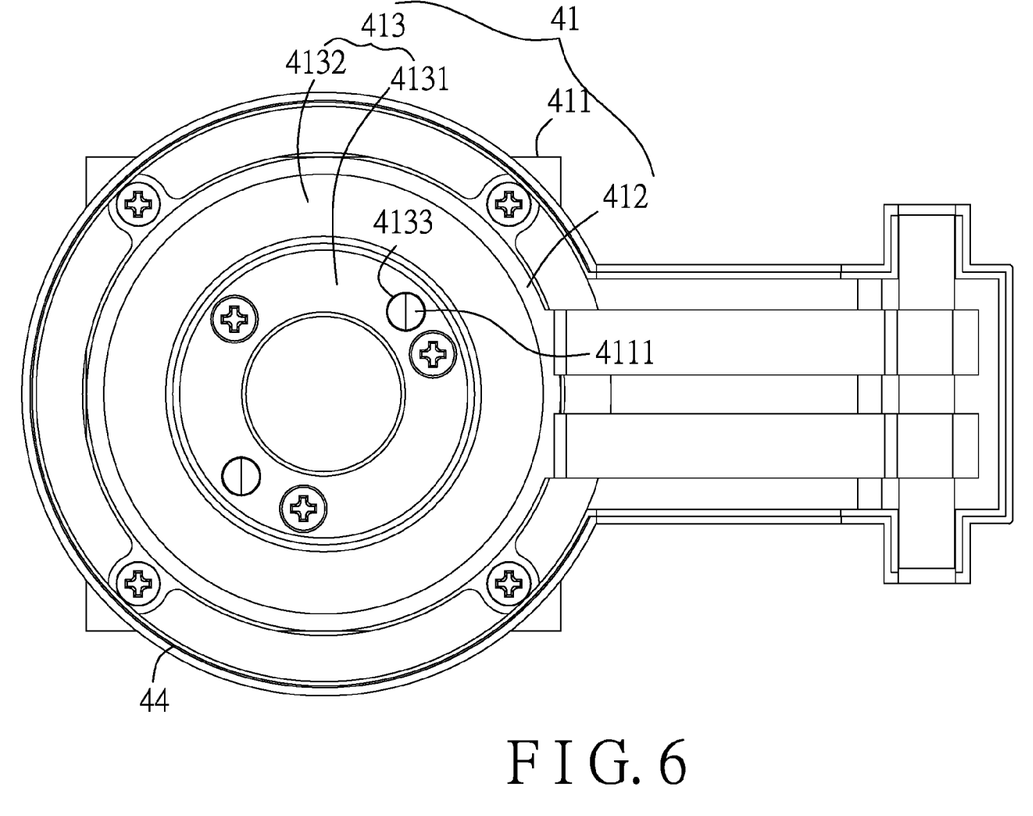
FIG. 6 is a top view of the connecting unit.

The connecting unit 4 includes a connecting seat 41 connected to the housing 11, a connecting arm 42 connected to the connecting seat 41, an outer cover 43 and an inner cover 44. In this disclosure, the connecting seat 41 includes a connecting member 411 that defines an axis, that is rotatable about the axis, and that is connected to the housing 11. Specifically, the connecting seat 41 further includes a ring 412 connected to the connecting arm 42, a rotatable insert 413 co-rotatable with the connecting member 411 relative to the ring 412, and a magnetic member 414. The rotatable insert 413 has a cylindrical body 4131 that extends into the ring 412, and a circular flange 4132 that extends radially and outwardly from an outer periphery of the cylindrical body 4131 and that is seated on the ring 412. The connecting member 411 is a plate that has a first connecting portion 4111 and a second connecting portion 4112. The first connecting portion 4111 is connected to the cylindrical body 4131. The second connecting portion 4112 extends outwardly from the first connecting portion 4111 and is connected to the housing 11. In this embodiment, the connecting member 411 and the cylindrical body 4131 are secured to each other by a plurality of screw fasteners 61. The connecting member 411 further has two positioning protrusions 4113 formed on the first connecting portion 4111. The cylindrical body 4131 has two positioning apertures 4133 that are respectively aligned to the positioning protrusions 4113. Preferably, the first connecting portion 4111 of the connecting member 411 has a plurality of first threaded holes 4114, and the cylindrical body 4131 has a plurality of second threaded holes 4134 (only one is visible in FIG. 4). Accordingly, the positioning protrusions 4113 and the positioning apertures 4133 cooperate to facilitate alignment between the first threaded holes 4114 and the second threaded holes 4134 before the screw fasteners 61 are threadedly extended into the first and second threaded holes 4114, 4134 to secure the first connecting portion 4111 to the cylindrical body 4131. Moreover, the second connecting portion 4112 of the connecting member 411 has four threaded holes 4115 that are respectively formed in four corners of the connecting member 411 for extension of and engagement with four screw fasteners 62 to secure the connecting member 411 to the housing 11. In this embodiment, the circular flange 4132 cooperates with the second connecting portion 4112 to sandwich the ring 412. Due to the interconnection therebetween, the connecting member 411 is co-rotatable with the rotatable insert 413 relative to the ring 412 about the axis defined by the connecting member 411. In this embodiment, the magnetic member 414 is disposed inside the cylindrical body 4131. The outer cover 43 and the inner cover 44 are assembled with each other and cooperatively accommodate the rotatable insert 413, the ring 412, the magnetic member 414 and at least a part of the connecting arm 42 therebetween, thereby enhancing aesthetic appeal of the support frame 2. In addition, the connecting member 411 further has a plurality of equidistantly spaced cambered protrusions 4116 formed on the second connecting portion 4112. The cambered protrusions 4116 abut against the inner cover 44 so as to reduce a contact area between the connecting member 411 and the inner cover 44. As such, friction between the connecting member 411 and the inner cover 44 can thereby be reduced during rotation of the connecting member 411.

The supporting unit 5 includes a pair of supporting arms 51, a handlebar 52 and a reinforcing member 53. Each of the supporting arms 51 has a first end portion 511 and a second end portion 512 opposite to the first end portion 511. The handlebar 52 is disposed between and connected to the first end portions 511 of the supporting arms 51. Preferably, the handlebar 52 has four finger grooves 521 for grasping by a user. In this embodiment, the first end portions 511 of the supporting arms 51 are disposed between and connected respectively and pivotally to the end portions 311 of the base 31 such that the supporting unit 5 is pivotable relative to the base 31 about an axis (A1) (see FIG. 2) and adjustably positioned relative to the base 31 in a stepless manner. The connecting arm 42 has an end arm portion that is distal from the connecting seat 41 and that is disposed between and connected pivotally to the second end portions 512 of the supporting arms 51 such that the connecting unit 4 is pivotable relative to the supporting unit 5 about an axis (A2) (see FIG. 2) and adjustably positioned relative to the supporting unit 5 in a stepless manner. The reinforcing member 53 interconnects the supporting arms 51 and is disposed between the first and second end portions 511, 512 of each of the supporting arms 51, thereby enhancing a structural strength of the supporting unit 5. Specifically, the reinforcing member 53 and the connecting seat 41 are stackable together. In this embodiment, the reinforcing member 53 is made of a magnetically attractive metal, or is a magnetic member. Accordingly, the reinforcing member 53 and the connecting seat 41 are secured in position by means of magnetic attraction when stacked together.

Figure 7:
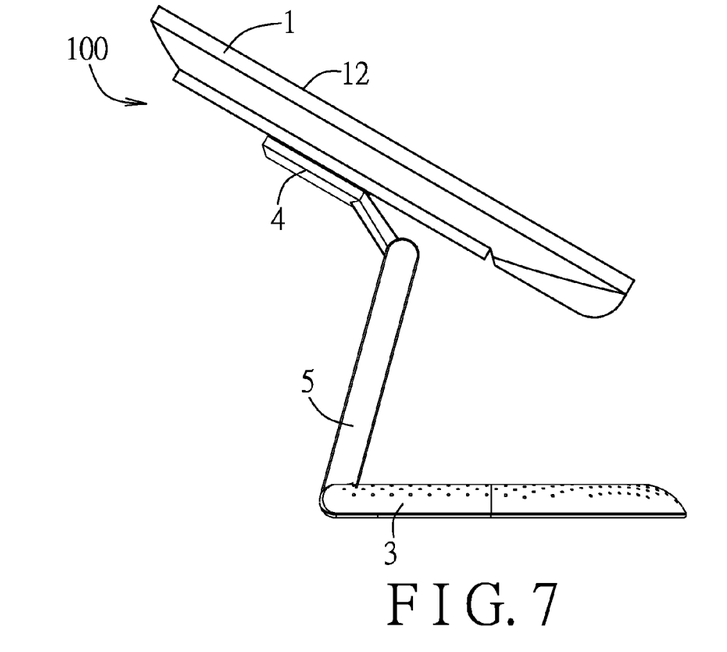
FIG. 7 is a schematic side view illustrating the electronic device in a state of use.
Figure 8:
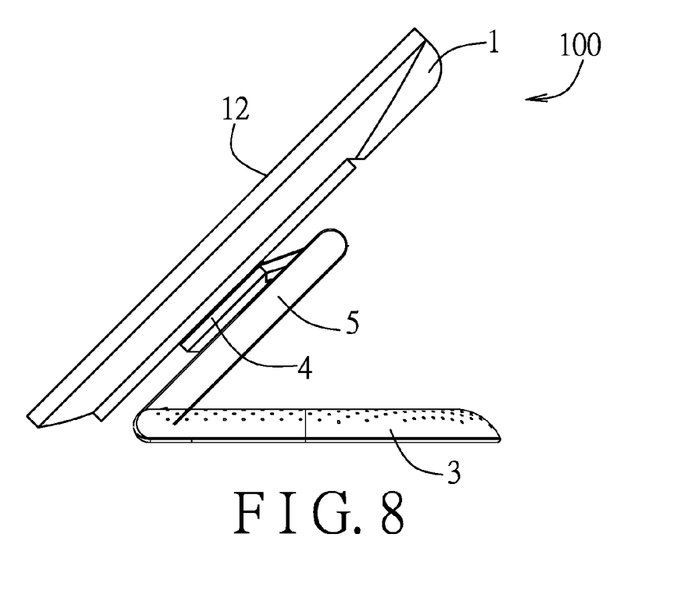
FIG. 8 is a schematic side view illustrating the electronic device in another state of use.
Figure 9:
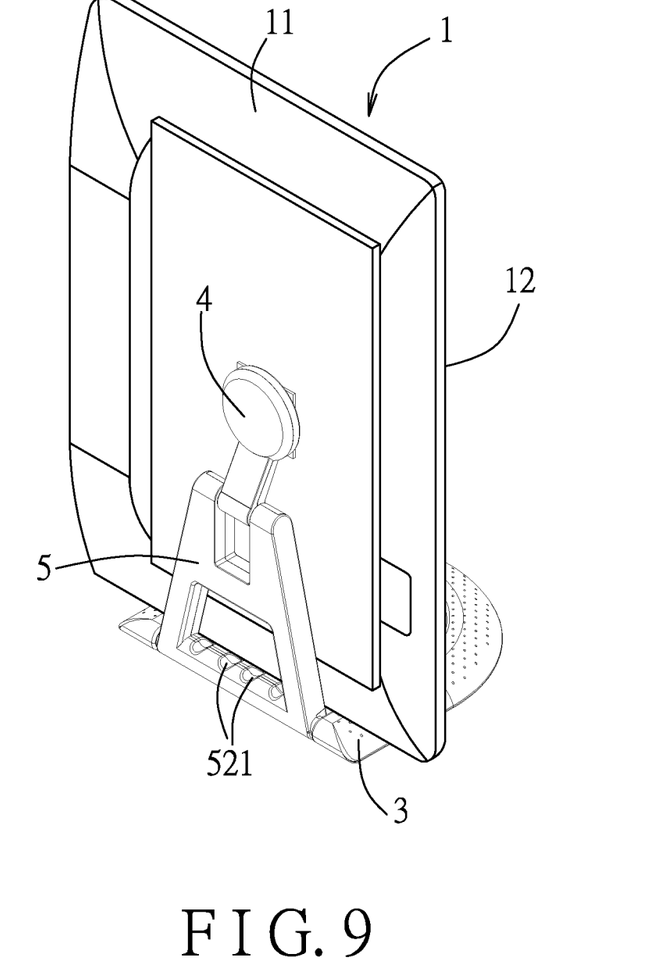
FIG. 9 is a perspective view illustrating the electronic device in still another state of use.

Referring to FIGS. 7 and 8, the main body 1 is firmly connected to the connecting unit 4 and is supported by the support frame 2. Since the connecting unit 4 is pivotably positioned relative to the supporting unit 5 in a stepless manner and since the supporting unit 5 is pivotably positioned relative to the base 31 in a stepless manner, the main body 1 is adjustable to be arbitrarily inclined and positioned in a height-adjustable manner relative to a tabletop (not shown). Especially, the display screen 12 is flippable to face forward or rearward. When a user needs to share information on the display screen 12 to other people sitting across from the user, it is only required to flip over the main body 1. Referring to FIG. 9, since the connecting member 411 is fixedly connected to the housing 11 of the main body and co-rotatable with the main body 1 about the axis that is defined by the connecting member 411, the main body 1 may be rotated to be placed in a portrait orientation (as shown in FIG. 9) or a landscape orientation (as shown in FIG. 1). That is to say, the main body 1 is rotatable in 360 degrees about the axis of the connecting member 411 to satisfy different orientation requirements of the main body 1 from the user.

Figure 10:
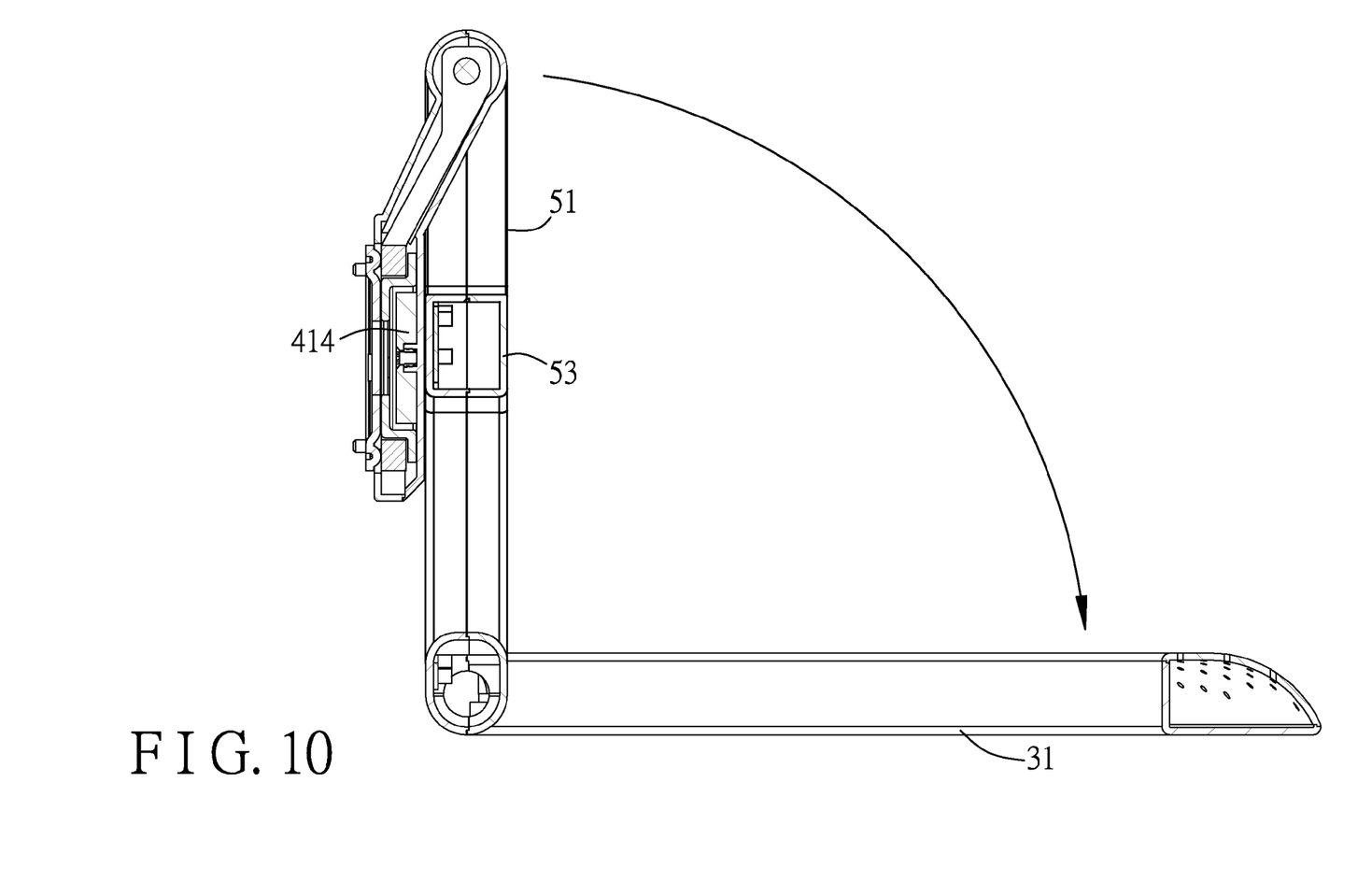
FIG. 10 is a partly sectional view illustrating the support frame.
Figure 11:
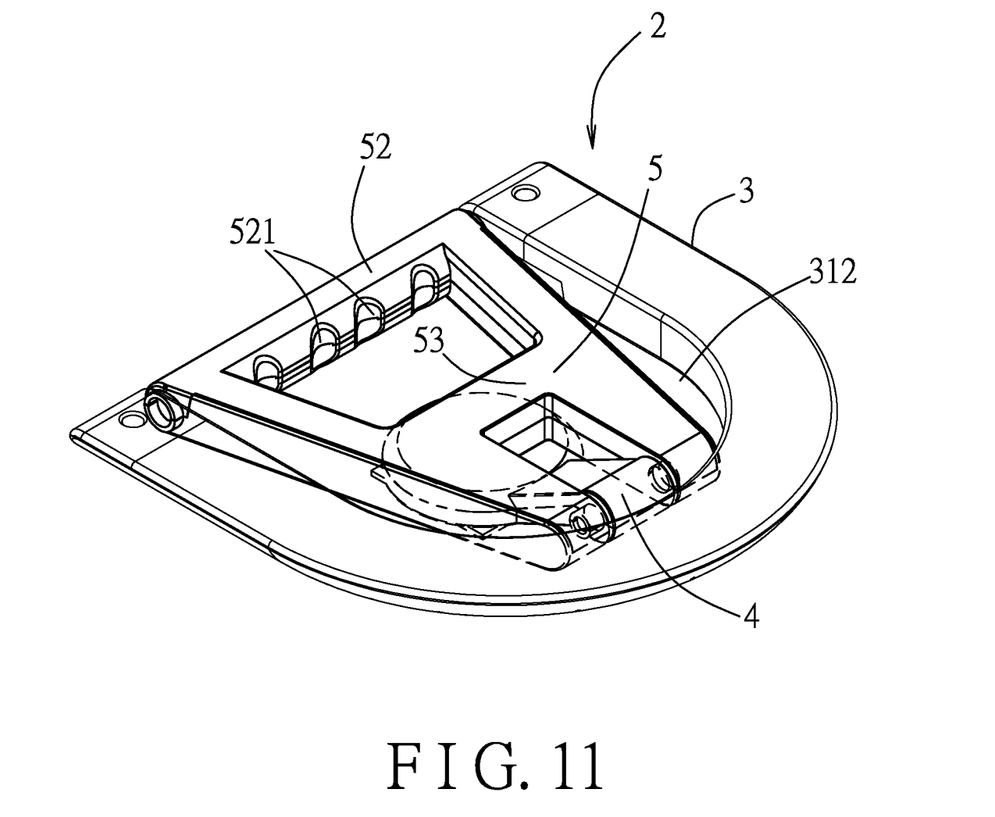
FIG. 11 is a perspective view illustrating the support frame in a storage state.
Figure 12:
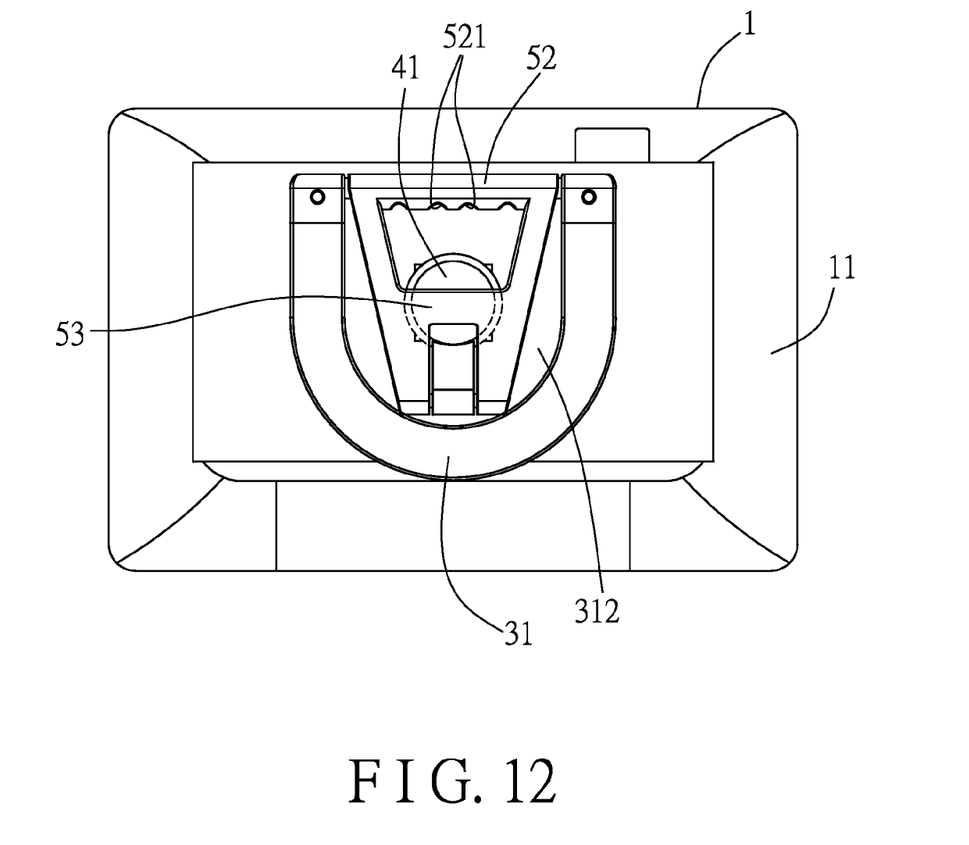
FIG. 12 is a schematic back view illustrating a stacked relationship between a main body of the electronic device and the support frame.

Referring to FIGS. 10 to 12, the connecting unit 4 and the supporting unit 5 are stackable together and are receivable in the receiving space 312 of the base unit 3, such that the support frame 2 is able to abut against the housing 11 in a compact configuration (as shown in FIG. 12). In such arrangement, the support frame 2 occupies relatively small storage space and can be conveniently stored. In addition, provision of the handlebar 52 facilitates transportation of the electronic device 100 with one hand. In addition, by virtue of the magnetic attraction between the magnetic member 414 of the connecting seat 41 and the reinforcing member 53, the connecting seat 41 and the reinforcing member 53 can be secured in position when stacked together. As shown in FIG. 12, the main body 1 and the handlebar 52 can be placed against each other such that the display screen 12 is kept relatively transverse to the ground surface (not shown) to ensure convenient transportation of the electronic device 100.

To sum up, since the support frame 2 is able to abut against the housing 11 in a compact configuration, the electronic device 100 can be conveniently stored. In addition, the electronic device 100 can be easily transported by grasping the handlebar 52. Besides, the support frame 2 is so configured that inclination, orientation and height of the main body 1 are adjustable to satisfy diverse usage requirements from the user. Moreover, since the speaker 32 is disposed inside the base 31, the structure of the base 31 can improve and amplify the sound produced by the speaker 32 to achieve a relatively high-quality sound effect. Accordingly, the support frame 2 is indeed multi-functional.

While the present disclosure has been described in connection with what is considered the most practical embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A support frame, comprising:
a base unit including a base that has two end portions and that defines a receiving space;
a connecting unit including a connecting seat and a connecting arm connected to said connecting seat; and
a supporting unit including a pair of supporting arms and a handlebar, each of said supporting arms having a first end portion and a second end portion opposite to said first end portion, said handlebar being disposed between and connected to said first end portions of said supporting arms, said first end portions of said supporting arms being disposed between and connected respectively and pivotally to said end portions of said base such that said supporting unit is pivotable relative to said base,
said connecting arm of said connecting unit having an end arm portion that is distal from said connecting seat and that is disposed between and connected pivotally to said second end portions of said supporting arms such that said connecting unit is pivotable relative to said supporting unit,
wherein said connecting unit and said supporting unit are stackable together and are receivable in said receiving space.

2. The support frame as claimed in claim 1, wherein said supporting unit further includes a reinforcing member that interconnects said supporting arms and that is disposed between said first and second end portions of each of said supporting arms, said reinforcing member and said connecting seat being stackable together and being secured in position by means of magnetic attraction when stacked together.

3. The support frame as claimed in claim 1, wherein said connecting unit is adjustably positioned relative to said supporting unit in a stepless manner.

4. The support frame as claimed in claim 3, wherein said supporting unit is adjustably positioned relative to said base in a stepless manner.

5. The support frame as claimed in claim 1, wherein said connecting seat includes a connecting member that defines an axis and that is rotatable about the axis.

6. The support frame as claimed in claim 5, wherein said connection seat further includes a ring connected to said connecting arm and a rotatable insert co-rotatable with said connecting member relative to said ring, said rotatable insert having a cylindrical body that extends into said ring, and a circular flange that extends radially and outwardly from an outer periphery of said cylindrical body and that is seated on said ring, said connecting member being a plate that has a first connecting portion and a second connecting portion, said first connecting portion being connected to said cylindrical body, said second connecting portion extending outwardly from said first connecting portion, and cooperating with said circular flange to sandwich said ring.

7. The support frame as claimed in claim 6, wherein said connecting unit further includes an outer cover and an inner cover, said outer cover and said inner cover being assembled with each other and cooperatively accommodating said rotatable insert, said ring and at least a part of said connecting arm therebetween.

8. The support frame as claimed in claim 1, wherein said base further has a hollow main portion that is connected to said end portions and that is formed with a plurality of through holes, said base unit further including a speaker that is disposed inside said hollow main portion.

9. The support frame as claimed in claim 1, wherein said handlebar has a plurality of finger grooves.

10. The support frame as claimed in claim 1, wherein said base has a substantially U-shaped configuration.

11. An electronic device, comprising:
a main body including a housing and a display screen mounted to said housing; and
a support frame including
a base unit including a base that has two end portions and that defines a receiving space;
a connecting unit including a connecting seat connected to said housing and a connecting arm connected to said connecting seat; and
a supporting unit including a pair of supporting arms and a handlebar, each of said supporting arms having a first end portion and a second end portion opposite to said first end portion, said handlebar being disposed between and connected to said first end portions of said supporting arms, said first end portions of said supporting arms being disposed between and connected respectively and pivotally to said end portions of said base such that said supporting unit is pivotable relative to said base,
said connecting arm of said connecting unit having an end arm portion that is distal from said connecting seat and that is disposed between and connected pivotally to said second end portions of said supporting arms such that said connecting unit is pivotable relative to said supporting unit,
wherein said connecting unit and said supporting unit are stackable together and are receivable in said receiving space, such that said support frame is able to abut against said housing in a compact configuration.

12. The electronic device as claimed in claim 11, wherein said supporting unit further includes a reinforcing member that interconnects said supporting arms and that is disposed between said first and second end portions of each of said supporting arms, said reinforcing member and said connecting seat being stackable together and being secured in position by means of magnetic attraction when stacked together.

13. The electronic device as claimed in claim 11, wherein said connecting unit is adjustably positioned relative to said supporting unit in a stepless manner.

14. The electronic device as claimed in claim 13, wherein said supporting unit is adjustably positioned relative to said base in a stepless manner.

15. The electronic device as claimed in claim 11, wherein said connecting seat includes a connecting member that defines an axis, that is rotatable about the axis, and that is connected to said housing.

16. The electronic device as claimed in claim 15, wherein said connection seat further includes a ring connected to said connecting arm and a rotatable insert co-rotatable with said connecting member relative to said ring, said rotatable insert having a cylindrical body that extends into said ring, and a circular flange that extends radially and outwardly from an outer periphery of said cylindrical body and that is seated on said ring, said connecting member being a plate that has a first connecting portion and a second connecting portion, said first connecting portion being connected to said cylindrical body, said second connect ing portion extending outwardly from said first connecting portion and being connected to said housing, said circular flange cooperating with said second connecting portion to sandwich said ring.

17. The electronic device as claimed in claim 16, wherein said connecting unit further includes an outer cover and an inner cover, said outer cover and said inner cover being assembled with each other and cooperatively accommodating said rotatable insert, said ring and at least a part of said connecting arm therebetween.

18. The electronic device as claimed in claim 11, wherein said base further has a hollow main portion that is connected to said end portions and that is formed with a plurality of through holes, said base unit further including a speaker that is disposed inside said hollow main portion.

19. The electronic device as claimed in claim 11, wherein said handlebar has a plurality of finger grooves.

20. The electronic device as claimed in claim 11, wherein said base has a substantially U-shaped configuration.

\* \* \* \* \*